United States Patent Office 3,435,058
Patented Mar. 25, 1969

3,435,058
CYCLOOCTADIENYL PALLADIUM CHLORIDE COMPLEX
Robert E. Rinehart, Wayne, N.J., assignor to Uniroyal, Inc., a corporation of New Jersey
No Drawing. Filed June 18, 1965, Ser. No. 465,169
Int. Cl. C07f 15/00; C08d 1/14; C08f 1/30
U.S. Cl. 260—429
8 Claims

ABSTRACT OF THE DISCLOSURE

The present invention relates to the reaction products of palladium chloride and a cyclooctadiene. The resulting cyclooctadienyl compounds are useful as polymerization and isomerization catalysts.

---

This invention relates to a new catalyst composition, its preparation and its use in chemical reactions. More specifically, the invention teaches a new composition, which is a complex of cyclooctadienyl palladium chloride having the formula $(PdClC_8H_{11})_2$, useful in polymerization and isomerization reactions. In accordance with this invention, it has been discovered that palladium chloride, $PdCl_2$, and 1,3-cyclooctadiene or 1,4-cyclooctadiene can be interacted to produce a complex of cyclooctadienyl palladium chloride. The reaction is preferably carried out in an alcohol solution wherein the complex precipitates. Purification may be readily performed by recrystallization from a solvent. The purified complex is a yellow crystal which decomposes, without melting, at 185° C.

This complex has unusual properties as an intermediate in isomerization reactions. Advantageously, it is formed from either 1,3- or 1,4-cyclooctadiene which can be decomposed by a suitable strong ligand donors or methanolic alkali to yield a hydrocarbon containing 55 to 65% of 1,4-cyclooctadiene. No other known isomerization of cyclooctadiene yields such high percentages of the 1,4-isomer. For example J. E. Arnet and R. Pettit, J. Am. Chem. Soc., 83, 2954 (1961), report the isomerization of 1,5-cyclooctadiene to 1,3-cyclooctadiene using an iron carbonyl catalyst. Although the presence of 1,4-cyclooctadiene was considered, none was found using the method of Arnet and Pettit. D. Devaprabhakara et al., J. Am. Chem. Soc., 85 (1963), report the isomerization of the 1,5-isomer using potassium t-butoxide in dimethyl sulfoxide as the catalyst. The hydrocarbon obtained by this method consisted almost entirely of 1,3-cyclooctadiene. R. E. Rinehart and J. S. Lasky J. Am. Chem. Soc. 86, 2516 (1964) reported the isomerization of 1,3-cyclooctadiene to the pi-complex of 1,5-cyclooctadiene rhodium chloride. No 1,4-cyclooctadiene was found, either within the complex or in the substrate.

The remarkable catalytic ability of the cyclooctadienyl palladium chloride is demonstrated in its use as a polymerization catalyst. Thus, norbornene can be polymerized in aqueous emulsion to yield a hard, tough thermoplastic resin with a crystalline X-ray defraction pattern. Dienes such as norbornadiene and butadiene are likewise polymerized by $(PdClC_8H_{11})_2$, in emulsion, to yield high molecular weight, useful thermoplatsic materials.

To form the complex of the invention, from 1 to 100 moles of the 1,3- or 1,4-cyclooctadiene are reacted with each mole of the palladium chloride. Preferably from 2 to 10 moles of the cyclooctadiene are reacted per mole.

Preferably, the reaction is carried out in a protonic solvent medium which dissolves both the palladium chloride and the cyclooctadiene. It is particularly advantageous to use a reaction medium which is not a solvent for the reaction product complex. By this procedure the complex may be readily separated after it precipitates from the reaction medium.

Any protonic solvent may be used, most preferably alcohols which are liquid at the reaction conditions, most desirably those having from 1 to 4 carbon atoms, such as methanol, isopropanol and t-butanol; and lower carboxylic acids having from 1 to 4 carbon atoms, particularly acetic acid.

Based on the weight of the complex from 5 to 200 parts by weight of solvent may be used, preferably, from 5 to 25 parts by weight per part of complex.

In the preparation of the complex the temperature is broadly between 0° and 100° C., preferably between 25 and 75° C. Since the reaction is performed in the liquid phase the pressure is only a secondary consideration. As a matter of convenience the reaction is performed at atmospheric pressure.

In order to isomerize 1,3-cyclooctadiene, the complex is formed in situ as an intermediate. Thereafter the complex intermediate is decomposed.

In the isomerization the same reaction conditions and reactant concentrations are employed as in the formation of the complex described above.

The purified complex is decomposed either by contact with a strong field ligand or methanolic alkali.

A strong field ligand is defined as a coordination donor which forms spin paired inner orbital, covalent complexes. These materials are discussed in Lewis et al. Modern Coordination Chemistry, Interscience (1960), p. 424, and include alkali metal cyanides, such as potassium cyanide. Other strong field ligands are set forth in the aforesaid text and are incorporated herein by reference. The decomposition with the strong field ligand, e.g., the alkali metal cyanide, is carried out in an aqueous reaction medium at a temperature in the range of 0° to 100° C., preferably from 25° to 100° C. The mole ratio of the ligand to the metal complex should be at least 6:1, preferably from 10:1 to 1000:1.

Decomposition with methanolic alkali, e.g. methanolic alkali metal hydroxide, is affected by reductive cleavage and is described in Christ et al., Angew. Chem. 75, 921 (1963). This reaction is generally performed between 0 to 100° C., but broader temperature ranges may be employed depending on the pressure applied. Preferably the temperature is about 15° C. to 75° C., the preferred upper limit being the reflux temperature. At least one mole of the methanolic alkali is used for each mole of the complex. There is no advantage in using more than 50 moles per mole. As a practical matter from 5 to 20 moles per mole are employed.

After decomposition, the hydrocarbon is obtained either by extraction with a suitable organic solvent, or purified by steam distillation.

The cyclooctadienyl palladium chloride is used as a catalyst in a more conventional sense for the various emulsion polymerization reactions.

The materials which may be polymerized include aliphatic dienes and bicyclic dienes and olefins, such as, norbornene, norbornadiene, butadiene and 1,3-pentadiene.

Substituted norboronene monomers which may also be polymerized are conveniently formed by the addition of cyclopentadiene to an olefin, to form the desired bicyclo-[2,2,1]-hept-2-ene structure.

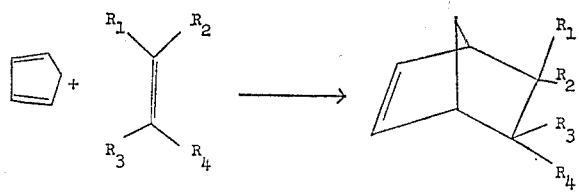

The monomers includes: (a) monosubstituted norbornenes such as 5-carbomethoxy-norboronene,
5-phenyl-2-norbornene,
2-norbornene-5-carboxylic acid, and
2-hydroxymethyl-5-norbornene;

(b) disubstituted norbornenes such as exo-dicyclopentadiene,
5-methyl-5-carbomethoxy-2-norbornene,
trans-dimethyl bicyclo-[2,2,1]-hept-5-ene-2,3-dicarboxylate, and
exo-dihydrodicyclopentadiene; and (c) halogenated norbornenes such as trans-5,6-dichlorobicyclo-[2,2,1]-hept-2-ene and
endo-cis-5,6-dichlorobicyclo-[2,2,1]-hept-2-ene.

Certain groups such as nitrilo, nitro, amino, amido, hydrazino and hydrazido are not suitable substituents in the monomers polymerized in this invention.

The emulsion polymerization is performed at a temperature from 0 to 100° C., preferably 25 to 60° C. Any of the well-known emulsifiers may be used, but anionic emulsifiers are preferred, e.g., the alkali metal salts of alkyl sulfates and alkyl aryl sulfonates. From 0.01 to 0.5 part by weight of the complex, 10 to 60 parts by weight of the monomer, and 2.5 to 10 parts by weight of emulsifier are added to 100 parts by weight of water in typical formulations.

In order to more fully describe the instant invention, the following examples are set forth:

EXAMPLE 1

Preparation of (PdCl$_8$H$_{11}$)$_2$

PdCl$_2$ (1.0 g.) was mixed with 2.0 ml. (1.75 g.) of 1,3-cyclooctadiene in 20 ml. of asbolute ethanol. The solution was agitated on a thermostated bath held at 50° for 67.2 hours. The solid product was removed by filtration, washed, and dried. There was obtained 1.25 g. of complex, which upon recrystallization from glacial acetic acid afforded yellow crystals.

*Analysis.*—Calcd. for (PdClC$_8$H$_{11}$)$_2$: C, 38.58; H, 4.45; Cl, 14.24. Found: C, 38.24; H, 4.34; Cl, 13.98.

A solution of the recrystallized (PdClC$_8$H$_{11}$)$_2$ in CHCl$_3$ was examined by nuclear magnetic resonance (TMS as internal standard) with the following results: The protons showed complex splitting, and occurred in two regions of the spectrum. The methylene protons (area 6) are grouped around 7.98 and 8.53τ. The double bond protons, complexed and uncomplexed (area 5) are spread between 3.8 and 5.4τ. The infrared spectrum showed no double bond at ca. 1670 cm.$^{-1}$ (unconjugated double bond) but did show an absorption at 1610 cm.$^{-1}$ (conjugated double bond).

EXAMPLE 2

Example 1 is repeated except 1,4-cyclooctadiene is used. A substantially identical product is obtained.

EXAMPLE 3

This example demonstrates the isomerization of 1,3-cyclooctadiene to a mixture of hydrocarbon containing substantial amounts of 1,4-cyclooctadiene.

PdCl$_2$ (0.5 g.) was mixed with 2.5 ml. of 1,3-cyclooctadiene (97% purity) in 20 ml. of methanol. The solution was placed in a sealed tube on a constant temperature bath held at 50° C. for 16 hours. The complex was removed by filtration, washed and dried, yielding 0.58 g. of crude product. The crude product was recrystallized from glacial acetic acid yielding 0.29 g. of yellow crystals:

*Analysis.*—Calcd. for (PdClC$_8$H$_{11}$)$_2$: C, 38.58; H, 4.45; Cl, 13.98. Found: C, 38.38; H, 4.68; Cl, 14.68.

Recrystallized complex (0.1 g.) was decomposed by 10% aqueous KCN. The hydrogen was extracted with pentane, and analyzed by gas chromatography, with the following results: 1,3-cyclooctadiene, 37%; 1,4-cyclooctadiene; 60%; 1,5-cyclooctadiene, 3%.

EXAMPLE 4

The recrystallized complex of Example 3 is dissolved in a methanol solution and methanolic sodium hydroxide is added at room temperature. About five moles of the methanolic alkali are present for each mole of the complex. The reaction is carried out at room temperature and after five minutes a black precipitate of palladium metal forms, evidencing the decomposition of the complex. Analysis of the hydrocarbon shows the formation of substantially the same product as found in Example 3.

EXAMPLE 5

This example demonstrates the use of (PdClC$_8$H$_{11}$)$_2$ as a polymerization catalyst.

The following recipes were made up in glass tubes which were then sealed and placed in a bath held at 50° C. for the time specified.

|  | A | B | C | D |
|---|---|---|---|---|
| (PdClC$_8$H$_{11}$)$_2$, g. | 0.1 | 0.05 | 0.05 | 0.05 |
| Abs. EtOH, ml. | 10 | | | |
| H$_2$O, ml. | | 20 | 20 | 20 |
| Nacconal NRSF,[1] g. | | 0.5 | 0.5 | 0.5 |
| Norbornene, g. | 2.5 | 5 | | |
| Norbornadiene, ml. | | | 5 | |
| Butadiene (liquid), ml. | | | | 5 |
| Reaction time, hrs. | 89 | 22.2 | 89 | 89 |
| Polymer yield, g. | 0.74 | 1.10 | 0.65 | 0.85 |

[1] Sodium alkyl benzene sulfonate, Sp. gr. 0.38–0.40, TM Allied Chemical & Dye Corp.

The polymers formed in runs A and B are white, only partly soluble in benzene, and can be molded to give a tough plastic. It is low in unsaturation by infrared and in this respect differs from the polynorbornene produced by Michelotti et al., J. Poly. Sci., A3, 895 (1965).

Run C produced a slightly yellow polymer soluble in benzene having a band at 1720 cm.$^{-1}$ in the infrared spectrum indicating the presence of a carbonyl group. A hard tough plastic may be cast from the benzene solution. Other infrared bands indicate no unsaturation and a considerable amount of nortricyclene repeating units (E. R. Lippincott, JACS 73 2001 (1963)).

Run D resulted in the formation of polybutadiene, a tough elastomer, insoluble in benzene with a ratio of unsaturation of trans 61.3%, cis 18.2%, and vinyl 20.5%. This is somewhat higher in vinyl and lower in trans than free radical emulsion polybutadiene.

Having thus described my invention, what I claim and desire to protect by Letters Patent is:

1. A complex of cyclooctadienyl palladium chloride having the formula (PdClC$_8$H$_{11}$)$_2$.
2. The reaction product of palladium chloride and a cyclooctadiene selected from the group consisting of the 1,3- and 1,4-isomers.
3. The reaction product of palladium chloride and 1,3-cyclooctadiene.
4. A process for preparing a cyclooctadienyl palladium chloride complex which comprises reacting palladium chloride with a cyclooctadiene selected from the group consisting of the 1,3- and the 1,4-isomers.
5. A process for preparing a cyclooctadienyl palladium chloride complex which comprises reacting palladium chloride with 1,3-cyclooctadiene.
6. A process for preparing cyclooctadienyl palladium chloride which comprises: admixing palladium chloride and a cyclooctadiene selected from the group consisting of the 1,3 and the 1,4-isomers in an alcoholic reaction medium and thereafter precipitating a complex of cyclooctadienyl palladium chloride.
7. The process of claim 6 wherein said alcohol is a lower alcohol.

8. The process of claim 7 wherein the lower alcohol is ethanol.

References Cited

UNITED STATES PATENTS

| | | | |
|---|---|---|---|
| 3,159,658 | 12/1964 | Fischer et al. | |
| 3,303,239 | 2/1967 | Cleary et al. | 260—683.15 |
| 3,306,951 | 2/1967 | Lapporte | 260—683.2 |

OTHER REFERENCES

Höttel et al.: Chem. Ber., vol. 97 (1964), pp. 2037–2045.

Robinson et al.: J. Chem. Soc. (London), 1964, pp. 5002–8.

Rinehart et al.: J. Am. Chem. Soc. 86 (1964), pp. 2516–8.

TOBIAS E. LEVOW, *Primary Examiner.*

A. P. DEMERS, *Assistant Examiner.*

U.S. Cl. X.R.

252—431; 260—80, 94.3, 666, 93.3, 93.7